United States Patent
Kim et al.

(10) Patent No.: US 8,166,545 B2
(45) Date of Patent: Apr. 24, 2012

(54) METHOD AND APPARATUS FOR DETECTING EXECUTABLE CODE

(75) Inventors: Dae Won Kim, Daejeon (KR); Yang Seo Choi, Daejeon (KR); Ik Kyun Kim, Daejeon (KR); Jin Tae Oh, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1083 days.

(21) Appl. No.: 12/044,393

(22) Filed: Mar. 7, 2008

(65) Prior Publication Data

US 2009/0025083 A1  Jan. 22, 2009

(30) Foreign Application Priority Data

Mar. 14, 2007 (KR) .................. 10-2007-0025033

(51) Int. Cl.
*G06F 11/00* (2006.01)
(52) U.S. Cl. ........................................ 726/23
(58) Field of Classification Search .............. 726/22–25, 726/11–13; 713/188
See application file for complete search history.

(56) References Cited

U.S. PATENT DOCUMENTS

| | | | |
|---|---|---|---|
| 2003/0212913 A1 | 11/2003 | Vella | |
| 2004/0133796 A1 | 7/2004 | Cohen et al. | |
| 2005/0229254 A1* | 10/2005 | Singh et al. | 726/23 |
| 2005/0235164 A1* | 10/2005 | Gassoway | 713/193 |
| 2006/0026675 A1* | 2/2006 | Cai et al. | 726/22 |
| 2008/0134334 A1* | 6/2008 | Kim et al. | 726/23 |
| 2008/0307524 A1* | 12/2008 | Singh et al. | 726/22 |
| 2009/0328185 A1* | 12/2009 | Berg et al. | 726/13 |

FOREIGN PATENT DOCUMENTS

| | | |
|---|---|---|
| KR | 102004008375 A | 1/2004 |
| KR | 1020040034862 A | 4/2004 |
| KR | 10-2004-0098902 A | 11/2004 |
| KR | 1020060063610 A | 6/2006 |

* cited by examiner

*Primary Examiner* — Nirav B. Patel

(57) ABSTRACT

There are provided an apparatus and method for detecting an executable code, capable of verifying reliability of an extracted signature by determining whether there is present an executable code in network data by using instruction pattern information related calling mechanism of function for distinguishing the executable code from a non-executable code, the method including: forming instructions by reverse assembling network data suspicious as an attack; comparing the respective formed instructions with instruction patterns according to calling mechanism of function; and determining whether there is present an executable code in the network data according to a result of the comparing.

19 Claims, 14 Drawing Sheets

METHOD AND APPARATUS FOR DETECTING EXECUTABLE CODE

CROSS-REFERENCE TO RELATED APPLICATIONS

This application claims the priority of Korean Patent Application No. 2007-0025033 filed on Mar. 14, 2007, in the Korean Intellectual Property Office, the disclosure of which is incorporated herein by reference.

This work was supported by the IT R&D program of MIC/IITA. [2006-S-042-01, Development of Signature Generation and Management Technology against Zero-day Attack]

BACKGROUND OF THE INVENTION

1. Field of the Invention

The present invention relates to network security technology, and more particularly, to an apparatus and method for detecting whether there is present an executable code which is attackable in network data to verify a signature.

2. Description of the Related Art

In a field of security for a network, when automatically extract an attack signature to prevent network data suspicious as an attack, a lot of false positives occur at a lower threshold of the extraction and a lot of false negatives occur at a high threshold of the extraction.

In a position of a security system that should prevent an attack, at least, false negative should not occur. Accordingly, apparatuses for detecting or preventing an attack should be developed in a direction of decreasing a threshold for extracting an attack signature. In this case, occurrence of a lot of false positives is unavoidable.

To decrease the occurrence of a lot of false positives, it is required to additionally verify an extracted signature and suspicious network data related to a formation of the signature. FIG. 1 is a graph illustrating a result of the verification, in which it may be known that a reliable signature may be selected via the verification.

In general network services, a transmission of an executable code hardly occurs. Accordingly, when there is present an executable code in network data, it means that an attack code is transmitted.

In the verification, a signature extracted to prevent network data suspicious as an attack is verified by determining whether there is present an executable code, thereby increasing reliability thereof.

To perform the verification, it is required to detect whether there is present an executable code in suspicious network data in a central processing unit. However, there is provided no related technology.

SUMMARY OF THE INVENTION

An aspect of the present invention provides an executable code detection method and apparatus capable of verifying reliability of an extracted signature by determining whether there is present an executable code in network data by using instruction pattern information related to calling mechanism of function to distinguish the executable code from a non-executable code.

According to an aspect of the present invention, there is provided a method of detecting an executable code, the method including: receiving network data; forming instructions by reverse assembling the received network data; comparing the respective formed instructions with instruction patterns according to calling mechanism of function; and determining whether there is present an executable code in the network data according to a result of the comparing.

According to another aspect of the present invention, there is provided an apparatus for detecting an executable code, the apparatus including: an instruction pattern storage storing information on instruction patterns according to calling mechanism of function; a packet processor extracting instruction strings by reverse assembling network data that is an object of a detection to check whether there is present an executable code therein; a comparator comparing to check whether there is an instruction pattern in accordance with each of the instructions extracted by the packet processor, in the stored instruction pattern; and a determiner determining whether there is present an executable code according to a result of the comparison of the comparator.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
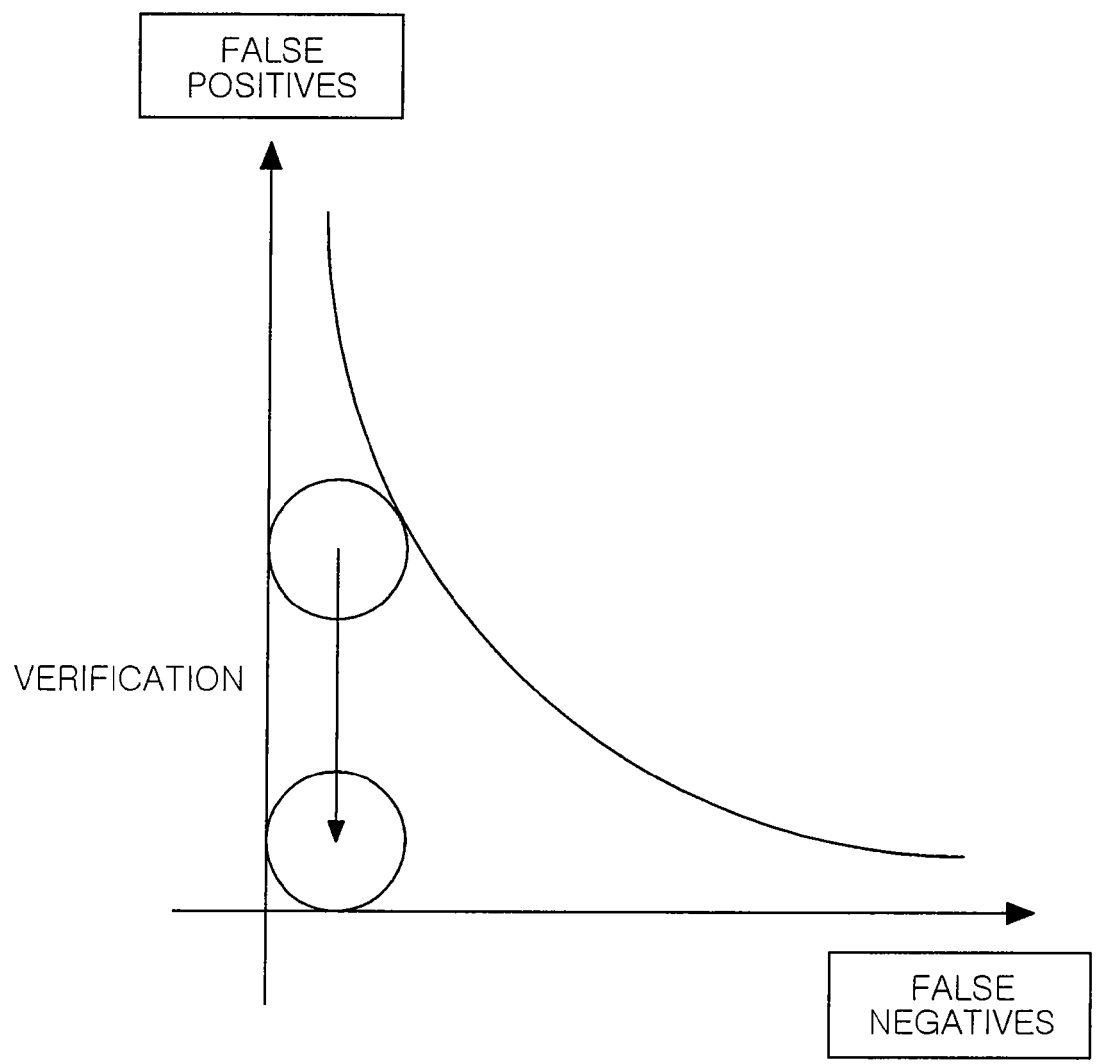
FIG. 1 is a graph illustrating a relation between a false positive and a false negative based on a threshold when extracting an attack signature.

Hereinafter, exemplary embodiments of the present invention will now be described in detail with reference to the accompanying drawings. Only, in describing operations of the exemplary embodiments in detail, when it is considered that a detailed description on related well-known functions or constitutions unnecessarily may make essential points of the present invention be unclear, the detailed description will be omitted.

Also, in the drawings, the same reference numerals are used throughout to designate the same or similar components.

In addition, throughout the specification, when it is describe that a part is "connected to" another part, this includes not only a case of "being directly connected to" but also a case of "being electrically connected to", interposing another device therebetween. Also, when it is described that an apparatus "includes" an element and there is no opposite description thereof, this is not designate that the apparatus excludes other elements but designates that the apparatus may further include other elements.

Also the term of "module" indicates a unit for processing a certain function or operation, which can be embodied by software, hardware, or a combination of software and hardware.

Figure 2:
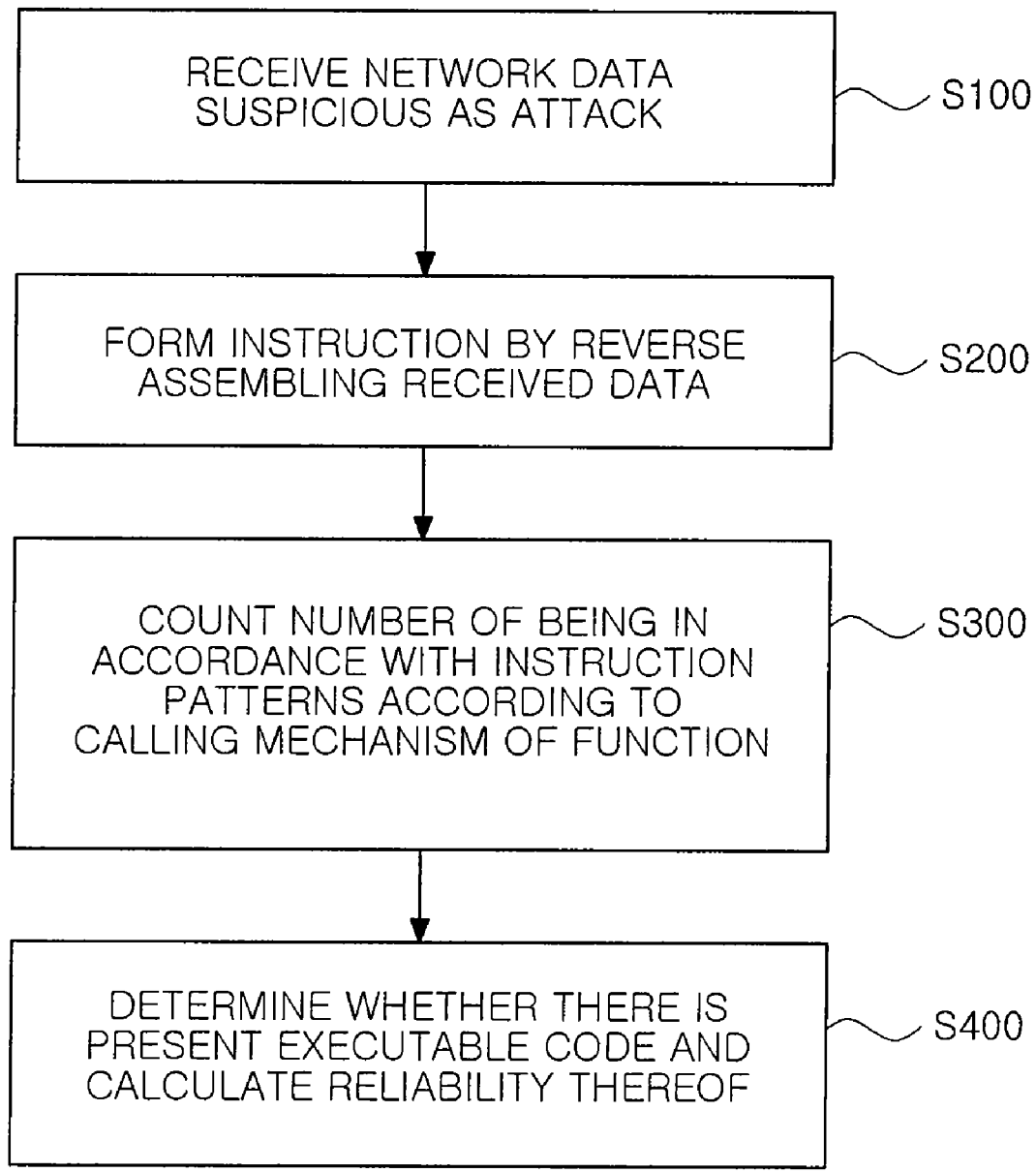
FIG. 2 is a flowchart illustrating an executable code detection method according to an exemplary embodiment of the present invention.

FIG. 2 is a flowchart illustrating a method of detecting an executable code in network data, according to an exemplary embodiment of the present invention.

Referring to FIG. 2, when data suspicious as an attack, which is collected network traffic or files, is inputted (S100), instructions are formed by reverse assembling the inputted data (S200). The formed instructions are compared with preset instruction patterns related to calling mechanism of function to determine whether there is present an executable code and a pattern accordance number of the inputted data is counted (S300). It is determined whether there is present an executable code in the data suspicious as an attack, by using the counted pattern accordance number and reliability of a determination result is calculated and provided (S400).

In this case, when there is present the executable code and the reliability of the determination is high, it is possible to determine the data as attack data.

Figure 3:
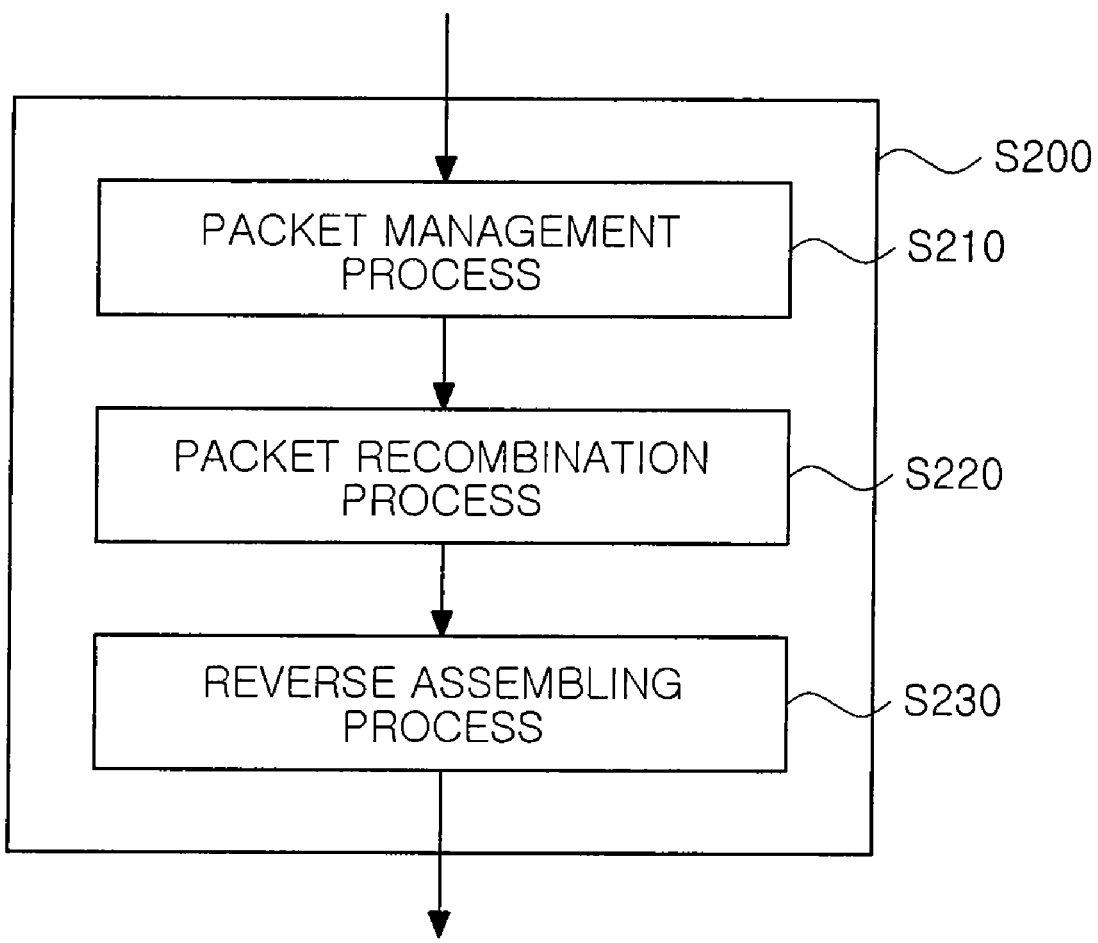
FIG. 3 is a flowchart illustrating a process of forming an instruction string in the executable code detection method, in detail.

FIG. 3 is a flowchart illustrating a process of the forming instructions in S200 in detail. The process includes a packet management process (S210), a packet recombination process (S220), and a reverse assembling process (S230).

Figure 4:
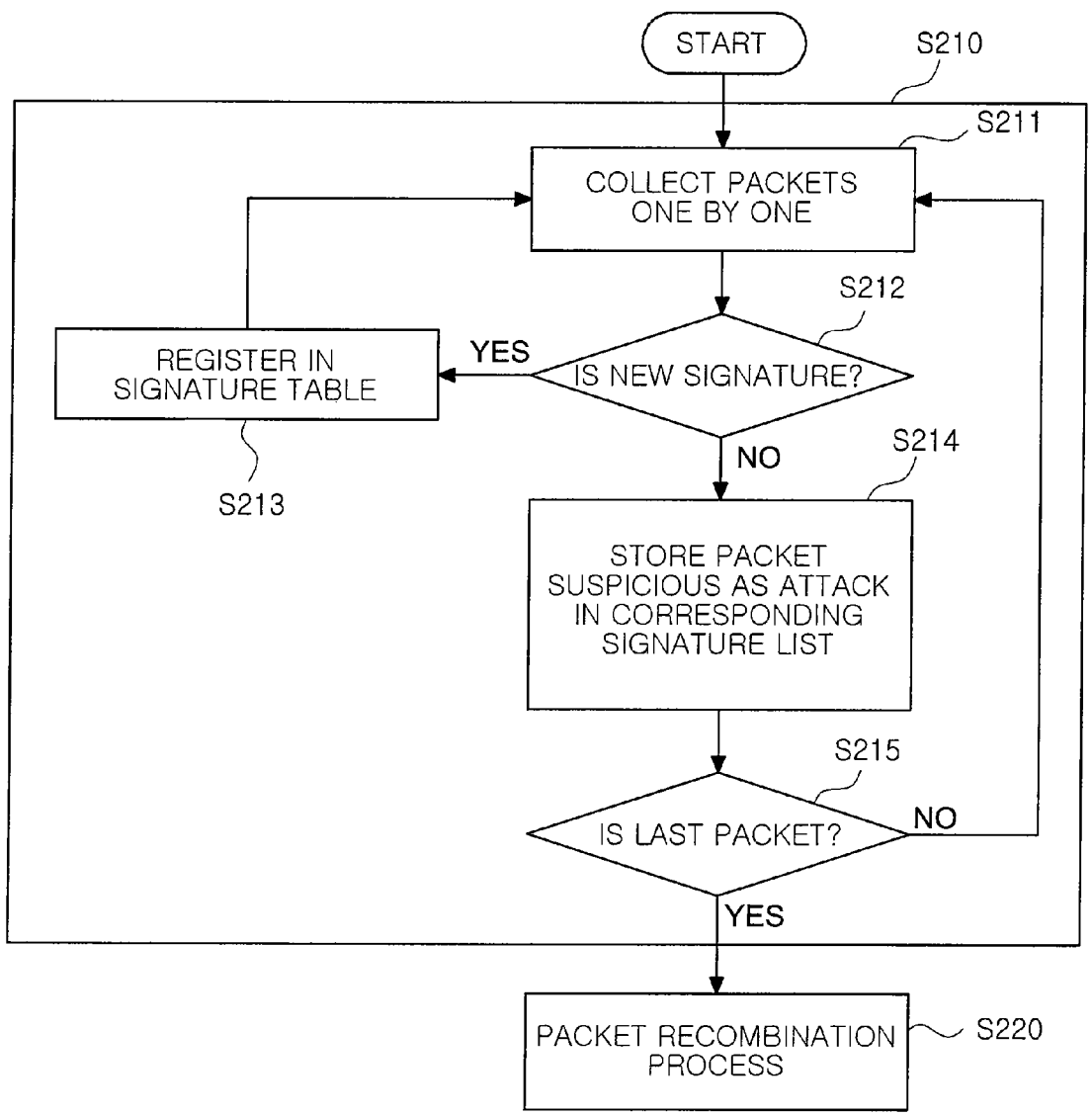
FIG. 4 is a flowchart illustrating a packet management process for forming the instruction string in the executable code detection method, in detail.
Figure 5:
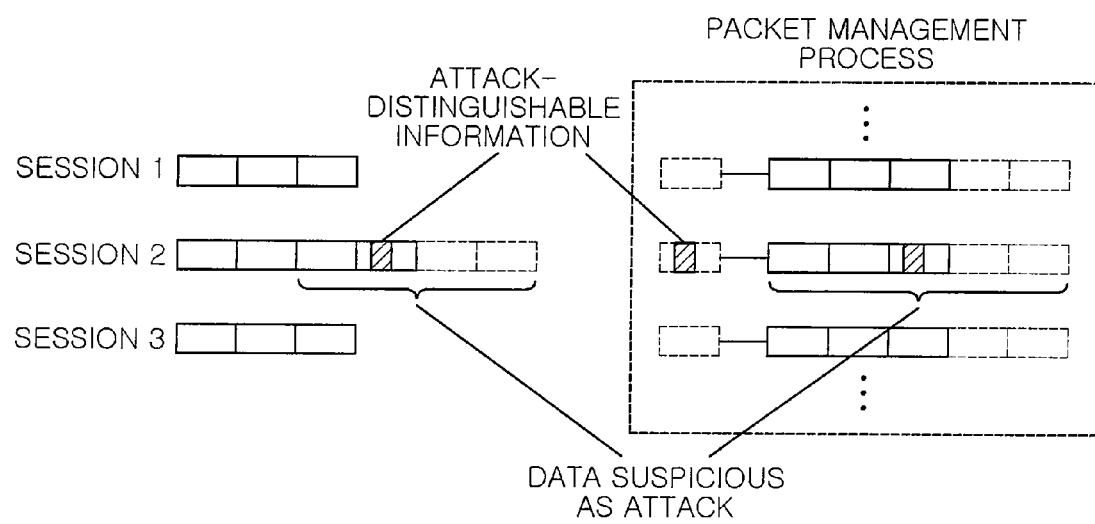
FIG. 5 is a diagram illustrating an example of the packet management process of FIG. 4.

FIG. 4 is a flowchart illustrating the packet management process (S210), and FIG. 5 is an example of a packet management state. The packet management process (S210) will be described with reference to FIGS. 4 and 5.

Referring to FIG. 4, the network data suspicious as an attack is collected by one packet (S211), it is determined whether the collected packet corresponds to a new signature (S212). When the collected packet is determined corresponding to the new signature, the collected packet is registered in a signature table (S213) and a next packet is collected. When the collected packet is not the new signature, the collected packet is stored in a signature list previously registered (S214). The network data suspicious as an attack may be sequentially stored for each extracted signature by performing the processes S211 to S214 on all packets of the network data. That is, against a case when various kinds of attacks simultaneously occur, packets may be arranged in a sequence of time for each kind of attacks.

In FIG. 5, there are shown network data suspicious as an attack in the left and packets arranged by the process (S210) in the right. As illustrated, packets of inputted network data are arranged in a sequence of time of receiving, based on information capable of distinguishing attacks, that is, a signature, by the process (S210).

Figure 6:
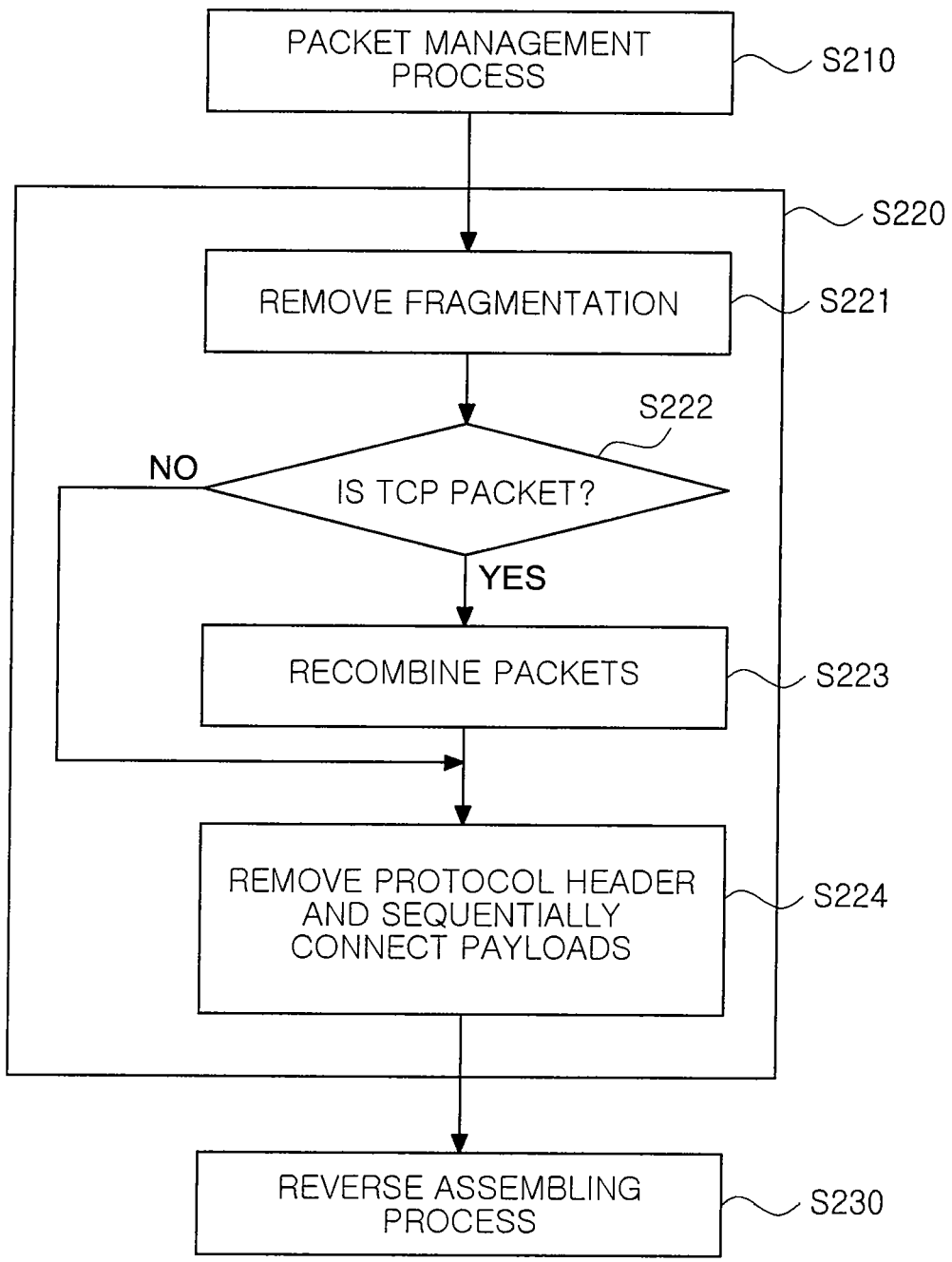
FIG. 6 is a flowchart illustrating a packet recombination process for forming the instruction string in the executable code detection method, in detail.

FIG. 6 is a flowchart illustrating the packet recombination process (S220) of FIG. 2 in detail.

Generally, the whole transmitted data suspicious as attacks are investigated by hardware in real time, there may occur one or more of out-of-sequence, fragmentation, and/or packet loss. In the packet recombination process (S220), the packets are processed to be available to be reverse assembled. In this case, data capable of being reverse assembled indicates data where a protocol header is excluded and only payloads capable of including an attack are sequentially connected.

Referring to FIG. 6, in the packet recombination process (S220), an IP header of the packet stored for each signature in S210 is parsed and fragmentation is removed therefrom (S221). When the packet is a transmission control protocol (TCP) packet (S222), the packet is recombined (S223). After removing all protocol headers from the packets, only payloads are sequentially connected (S224).

The data where only the payloads are connected is transmitted to be reverse assembled.

Figure 7:
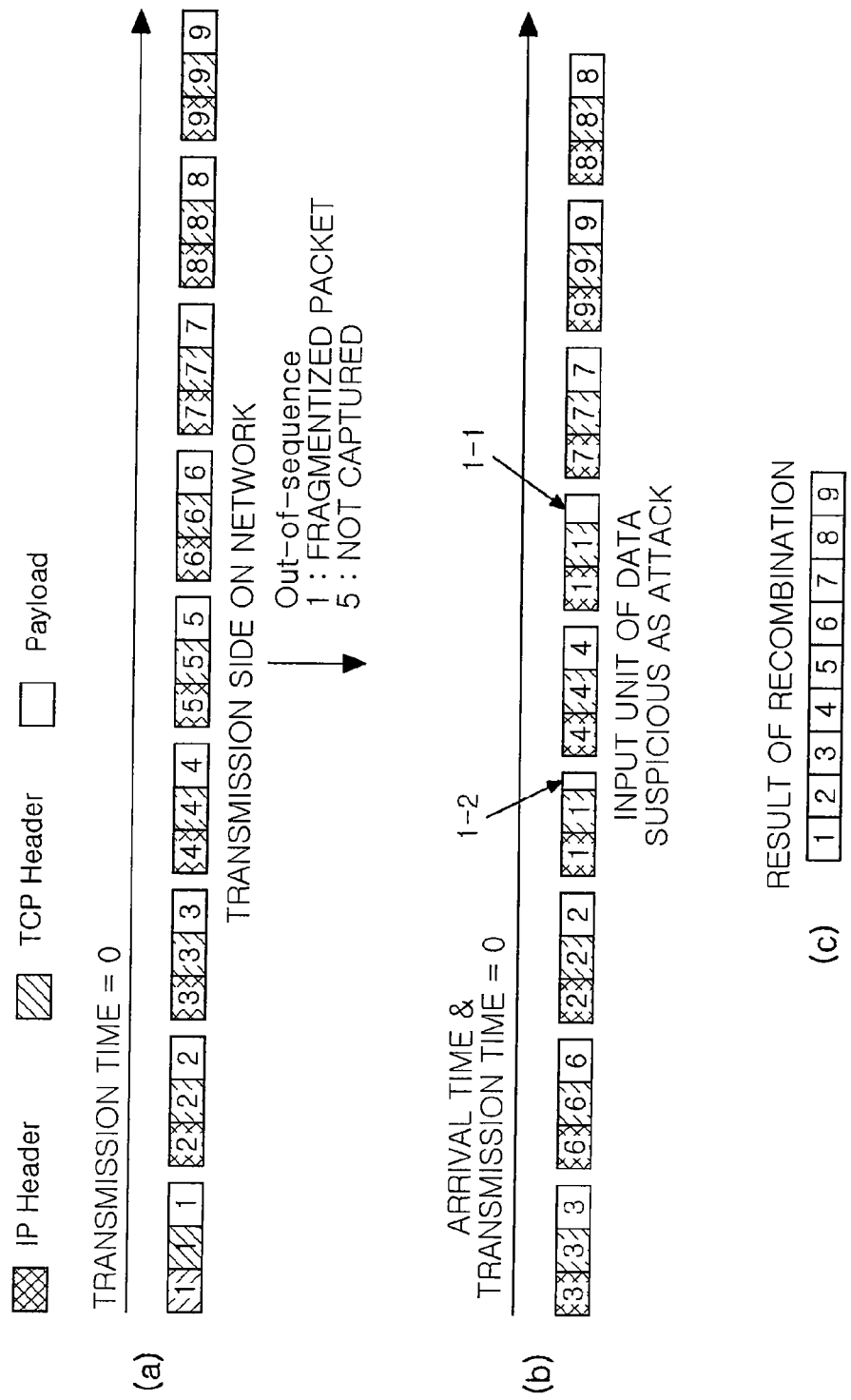
FIGS. 7A to 7C illustrate an example of the packet recombination process of FIG. 6.

FIGS. 7A to 7C illustrate an example of the packet recombination process (S220). When data as shown in FIG. 7A is sequentially transmitted, an attack detection or attack prevention system according to the present invention may receive network data as shown in FIG. 7B. That is, referring to FIGS. 7A and 7B, in the network data received to detect an attack, a packet 5 is lost in a transmission and not received, a packet 1 is fragmentized, and a sequence of packets is changed.

Accordingly, when the network data shown in FIG. 7B is inputted as data suspicious as an attack, in the packet recombination process (S220), the fragmentized packet 1 is put together and fragmentation thereof is removed. In addition, when each packet is a TCP packet, the packet is recombined. The packets are recombined as shown in FIG. 7C by removing a protocol header thereof and sequentially connecting payloads.

That is, referring to FIG. 7C, the payloads of the respective packet of the network data are sequentially arranged.

The data where the packet recombination is performed as described above is reverse assembled by a reverse assembly algorithm in S230 and is stored as an instruction string. In this case, there are many kinds of reverse assembly algorithms for each architecture and operating system (OS), which are generally known.

The instruction string formed in S230 is compared with a preset instruction pattern according to call mechanism of function and an accordance number thereof is counted in S300. S300 is a process for checking how much the instruction string formed by reverse assembling the sequentially connected payloads is in accordance with the instruction pattern according to the calling mechanism of function.

Figure 8:
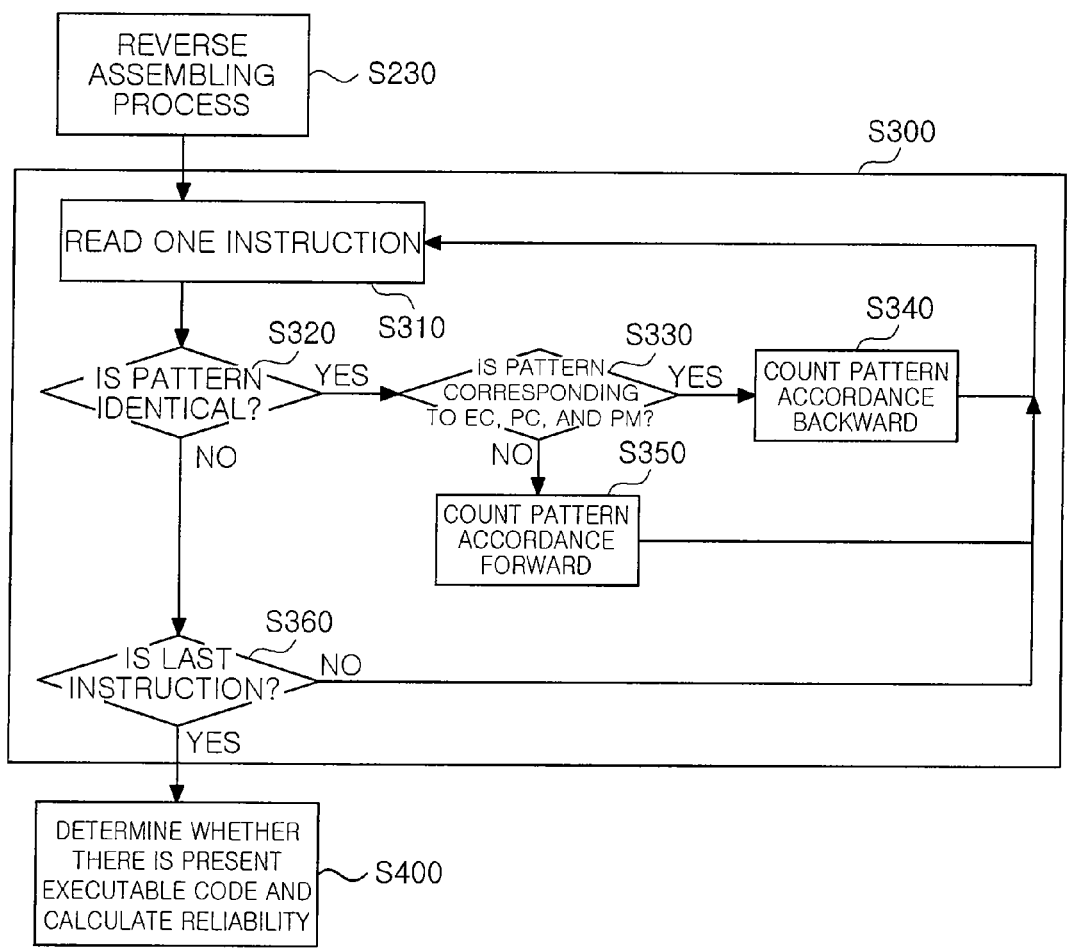
FIG. 8 is a flowchart illustrating an operation of comparing in the executable code detection method, in detail.

FIG. 8 is a flowchart illustrating sub-operations of S300. Referring to FIG. 8, when the instruction string formed from the network data suspicious as an attack is inputted, one instruction is read from the instruction string in S310 and is compared with the preset instruction pattern according to the calling mechanism of function to check accordance therebetween in S320. In this case, when there is a corresponding pattern, the corresponding pattern is checked in S330. In S330 to S350, when the pattern corresponds to ec, pc, and pm, pattern accordance is counted backward. When the pattern does not correspond to ec, pc, and pm, pattern accordance is counted forward.

When S310 to S350 are performed on all instructions of the instruction string formed from the network data suspicious as an attack, following operation S400 is performed.

Hereinafter, the instruction patterns according to the calling mechanism of function will be described.

Figure 9:
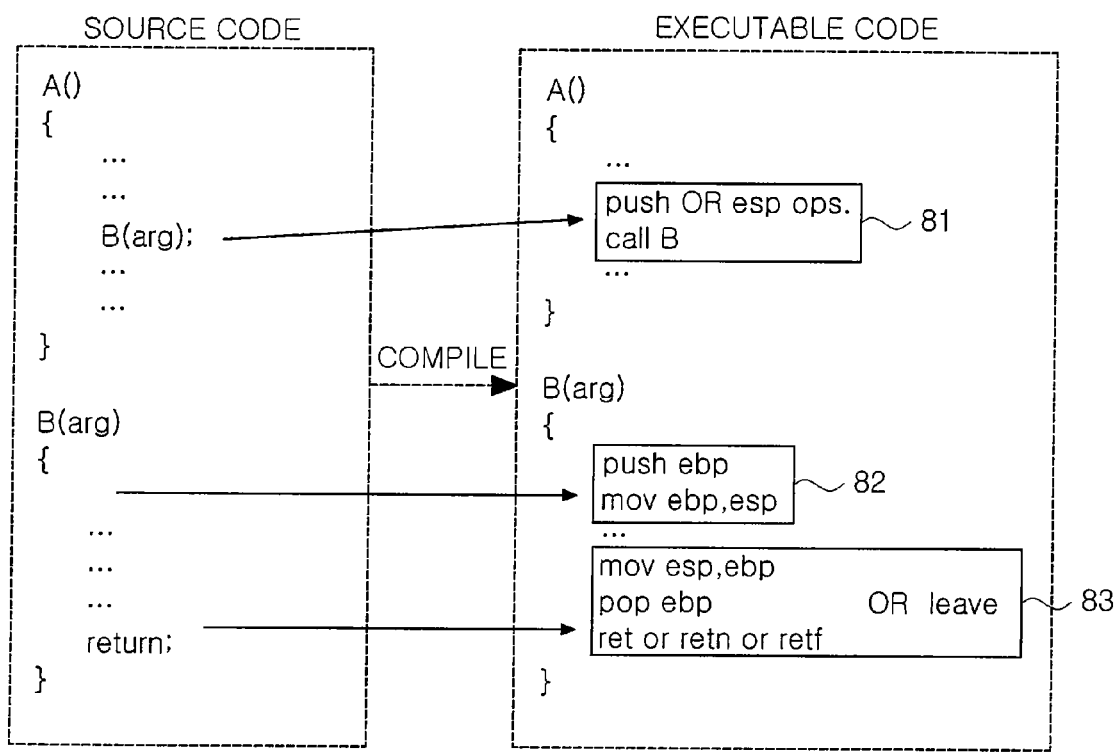
FIG. 9 is a diagram illustrating an example of an instruction pattern according to the calling mechanism of function.

FIG. 9 illustrates patterns according to the calling mechanism of function, present in an executable code. In FIG. 9, there are shown a source code in the left and an executable code generated when the source code is compiled in the right. In the executable code, particular instruction patterns 81 to 83 are shown.

The particular instruction patterns are shown in the executable code as described above since functions in the executable code execute a original function by mutually calling and the calling mechanism of function is shown to normally execute the function.

Figure 10:
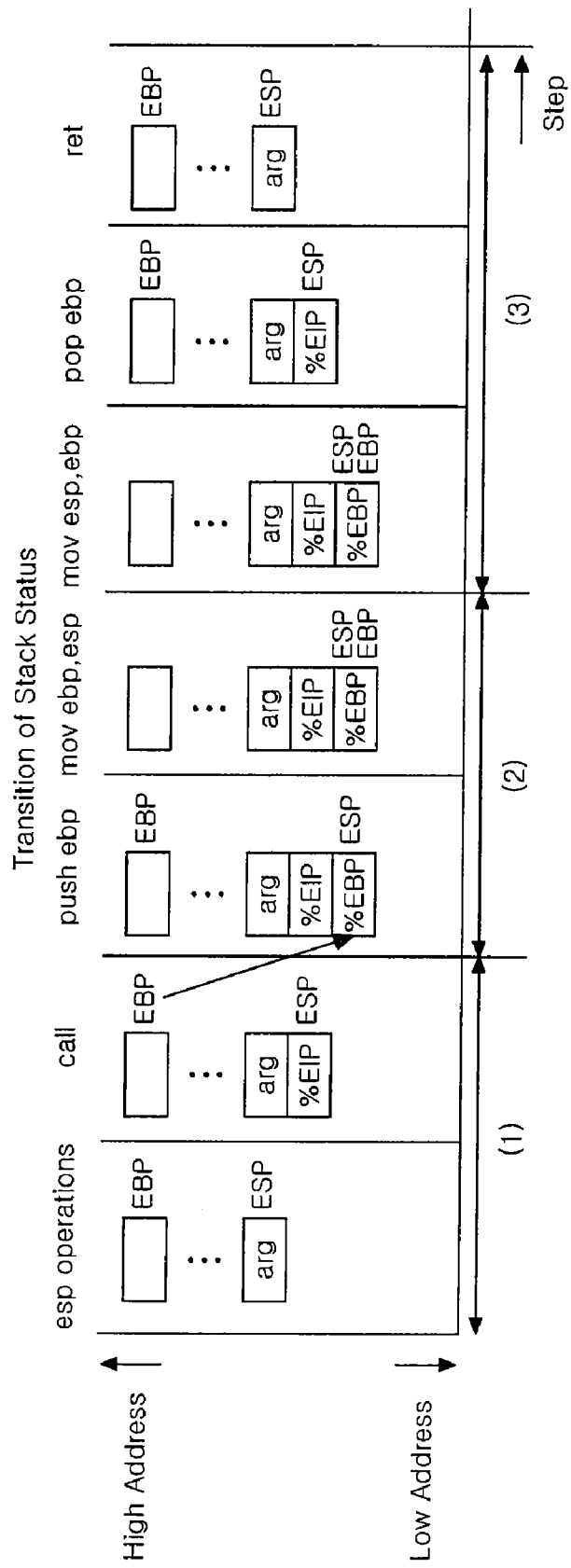
FIG. 10 is a diagram illustrating the calling mechanism of function.

FIG. 10 is a diagram illustrating the calling mechanism of function. Referring to FIG. 10, the calling mechanism of function will be described.

According to the calling mechanism of function, an argument Arg required for a function call is put in a stack of ESP, a program counter EIP which indicates a location of the present execution of a code is put in the stack of ESP, and the program counter is jumped into a portion where a code of a called function is present. The function called as described above store a base register EBP value which stores a location of starting a local variable of the calling function and changes the base register EBP value to a location of starting a local variable of the called function. When an execution of the called function is finished and returns, the stack of ESP and the base register EBP are restored to a state right before the calling.

In the calling mechanism of function, the particular instruction patterns are present. A combination of instructions to be used to detect an executable code in FIG. 9 is shown in Table 1.

TABLE 1

| Meaning of pattern | Symbol of pattern | Pattern 1 | Pattern 2 | Pattern 3 |
|---|---|---|---|---|
| Function call | ec | Instructions related to esp | Instructions related to call | |
| | pc | push | Instructions related to call | |
| Function start | pm | push ebp | mov ebp, esp | |
| Function return | mpr | mov esp, ebp | pop ebp | Instructions related to ret |
| | pr | pop ebp | Instructions related to ret | |
| | lr | leave | Instructions related to ret | |

In Table 1, there are present several pattern symbols for each meaning of pattern since the forms of instruction patterns having the same meaning are different for each OS or compiler. The meaning of the instructions related esp is that a stack operation present before call is considered as an operation transferring an argument of a function to be called. There are call and callf as instructions related to call. There are ret, retn, and retf as instructions related to ret.

Based on the instruction patterns as shown in Table 1, instructions converted from the network data suspicious as an attack are compared. In this case, the instructions are in accordance with the patterns 1 and 2 or the patterns 1, 2, and 3, a pattern accordance count value is increased. In this case, the pattern accordance count is measured for each pattern symbol forward and backward since a pattern reference is different for each pattern. In Table 1, a pattern indicating function call and function start is detected based on the pattern 2 and a pattern indicating function return is processed as pattern accordance based on the pattern 1. The forward pattern accordance count indicates detecting instructions that will be shown, and the backward pattern accordance count indicates detecting instructions that have been passed. For example, in the case of ec pattern, when an instruction related to call is detected from inputted data, it is detected whether there are present instructions related to esp in front instructions and a pattern accordance count is increased when there are present the instructions. On the other hand, in the case of mpr pattern, when mov esp and ebp are detected from the inputted data, it is detected whether there are present instructions related pop ebp and ret in rear instructions and a pattern accordance count is increased when there are present the instructions.

In Table 1, instructions such as mov ebp, esp, pop ebp, and leave are determined as reference instructions for pattern accordance since the described instructions are hardly shown in an executable code.

Figure 11:
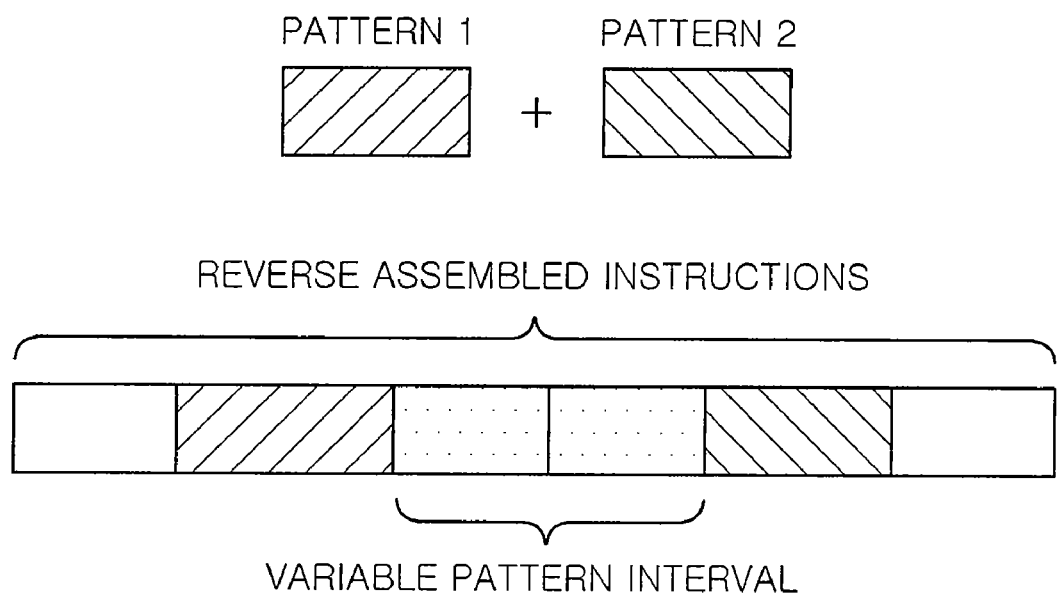
FIG. 11 is a diagram illustrating a process of determining pattern accordance in the executable code detection method.

Particularly, when checking whether in accordance with the pattern, it is not detected whether the patterns 1, 2, and 3 of the instruction patterns according to the calling mechanism of function as shown in Table 1 are consecutively in accordance with the instruction since, actually, executable codes are according to the calling mechanism of function but a combination of instruction patterns is not consecutively identical according to characteristics of a compiler. It may be determined whether there is pattern accordance within an instruction interval as allowable as possible. When out of the allowable interval after starting pattern accordance, it is determined as an accordance failure. FIG. 11 illustrates the allowable interval. Referring to FIG. 11, though the patterns 1 and 2 of the particular instruction pattern are detected from the reverse assembled instructions, it is determined as pattern accordance when an interval between the detected patterns 1 and 2 should be within a preset allowable interval. It is determined as pattern discordance when the interval between the patterns 1 and 2 is out of the allowable interval.

Figure 13:
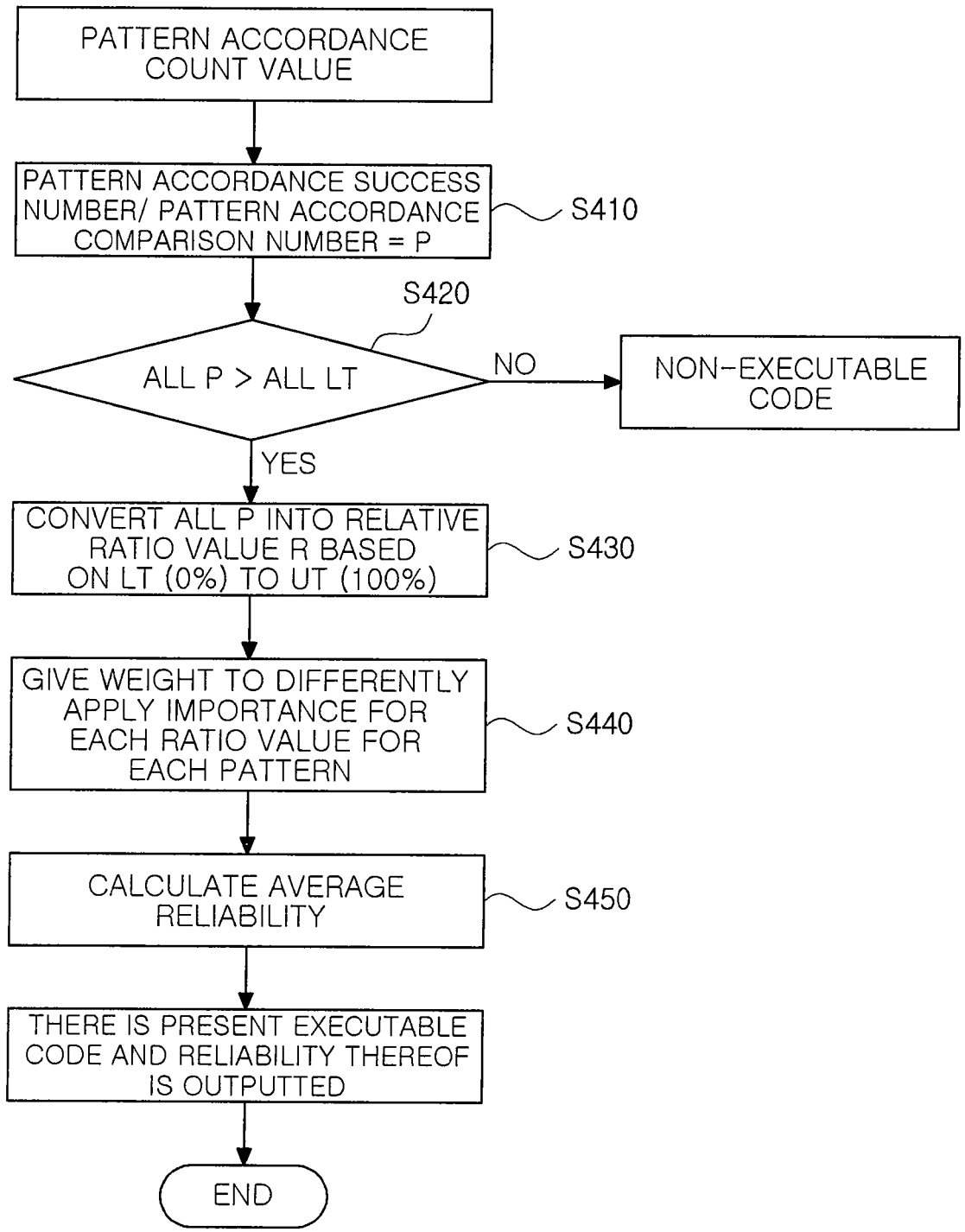
FIG. 13 is a flowchart illustrating a process of determining whether there is present an executable code and calculating reliability in the executable code detection method.

FIG. 13 is a flowchart illustrating a process of determining whether there is present an executable code in network data suspicious as an attack by using the pattern accordance count result in S400 and a process of calculating reliability thereof.

In addition, in the present invention, to detect the executable code and to check the reliability thereof, for each preset instruction pattern according to the calling mechanism of function, a maximum instruction interval, an upper threshold, and a lower threshold are set.

TABLE 2

| Pattern symbol | Maximum instruction interval | Upper threshold | Lower threshold |
|---|---|---|---|
| ec | Iec | UTec | LTec |
| pc | Ipc | UTpc | LTpc |
| pm | Ipm | UTpm | LTpm |
| mpr | Impr | UTmpr | LTmpr |
| pr | Ipr | UTpr | LTpr |
| lr | Ilr | UTlr | LTlr |

In Table 2, there are illustrated a maximum instruction interval, an upper threshold UT, and a lower threshold LT set to detect the executable code and to calculate the reliability for each pattern shown in Table 1.

The lower threshold LT is a probability of being in accordance with the instruction pattern satisfying the calling mechanism of function in the maximum instruction interval in the case of a non-executable code. The upper threshold UT is a probability of pattern accordance in the maximum instruction interval in the case of the executable code. Accordingly, when a probability where instructions formed by reverse assembling network data to be verified are in accordance with the instruction patterns is the lower threshold LT and less, it may be a non-executable code. When the probability is more than the lower threshold LT and the upper threshold UT or less, the executable code may be included, which is capable of being determined according to reliability thereof. When the probability is more than the upper threshold UT, it may be an executable code.

Figure 12:
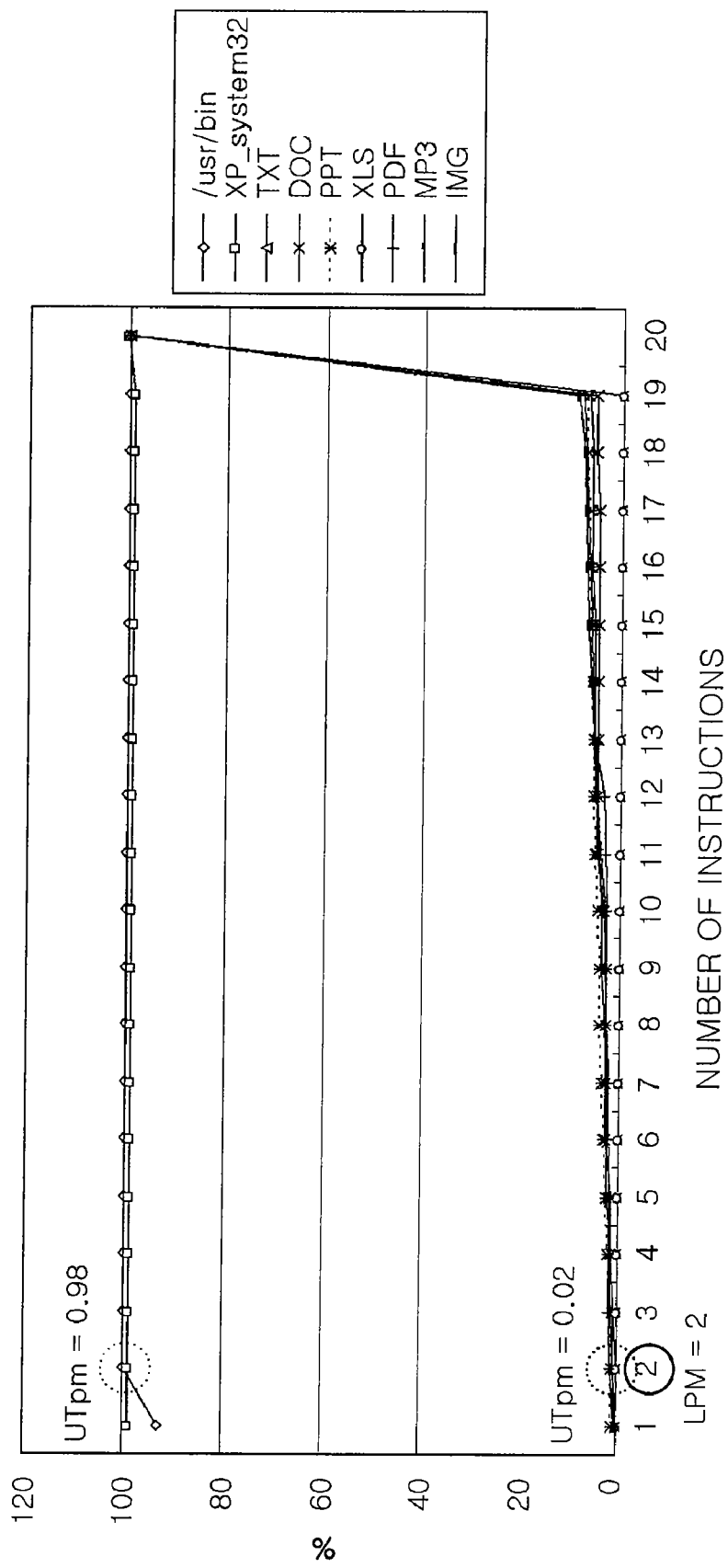
FIG. 12 is a graph illustrating a result of simulation for setting a maximum instruction interval, an upper threshold, and a lower threshold in the executable code detection method.

FIG. 12 illustrates a result of a simulation for setting a maximum instruction interval I, an upper threshold UT, and a lower threshold LT of pm that is one of the instruction patterns shown in Table 1, in which 3000 of samples are simulated for each kind of a file with respect to pm that is the instruction pattern. Referring to FIG. 12, executable codes such as LINUX and Window execution files show a high pattern accordance probability of 98% or more in two instruction intervals.

Sub-operations of S400 will be described in detail with reference to FIG. 13.

When S300 is finished, with respect to the network data suspicious as an attack, a number of checking pattern accordance for each preset instruction pattern and a number of successes are counted and provided.

In S410, a ratio value P of a pattern accordance success number to a pattern comparison number in S300 is obtained. In S420, it is checked that all obtained ratio values P are more than the preset lower threshold LT of the corresponding instruction pattern.

In S420, when all ratio values are more than the lower threshold LT, the corresponding network data is determined to include an executable code and a reliability value thereof is checked. In S420, when all ratio values are not more than the lower threshold LT, it is determined that the network data does not include the executable code. In this case, as the ratio value P is close to the upper threshold UT, a reliability value thereof increases.

Accordingly, in S420, when the network data is determined to include the executable code, all the calculated ratio values P are converted into a new ratio value R according to a relative position in an area where the lower threshold LT is considered as 0% and the upper threshold UT is considered as 100%, in S430.

In proportion to the converted ratio value R, the reliability of the determination result is calculated. In this case, in S440, a weight W is given for each instruction pattern according to an importance thereof and applied to the converted ratio value R. In S450, an average of the converted ratio values R is obtained and finally, a reliability value Ravg of the determination result is calculated.

With respect to the inputted network data suspicious as an attack, a result indicating that there is present the executable code and the calculated reliability value Ravg with respect to the result are outputted together.

A process of calculating the reliability value Ravg with respect to the result via the described operations S410 to S450 is expressed as shown in following Equation 1, $$R_i = \frac{UT_i - P_i}{UT_i - LT_i}, \text{ if } R_i < 0, R_{i=1}$$ Equation (1)

-continued
$$\sum_{i}^{MAX\_PTN\_NUM} W_i = MAX\_PTN\_NUM$$

$$R_{avg} = \frac{\sum_{i}^{MAX\_PTN\_NUM} W_i \cdot R_i}{MAX\_PTN\_NUM}$$

Wherein i indicates ith instruction pattern, P indicates a ratio of a pattern accordance success number to a pattern accordance comparison number, R indicates a value obtained by converting the P, and MAX_PTN_NUM indicates a number of total patterns to be detected.

As shown in Table 1, the reliability of the result of detecting the executable code is calculated to show how close to the upper threshold UT.

Figure 14:
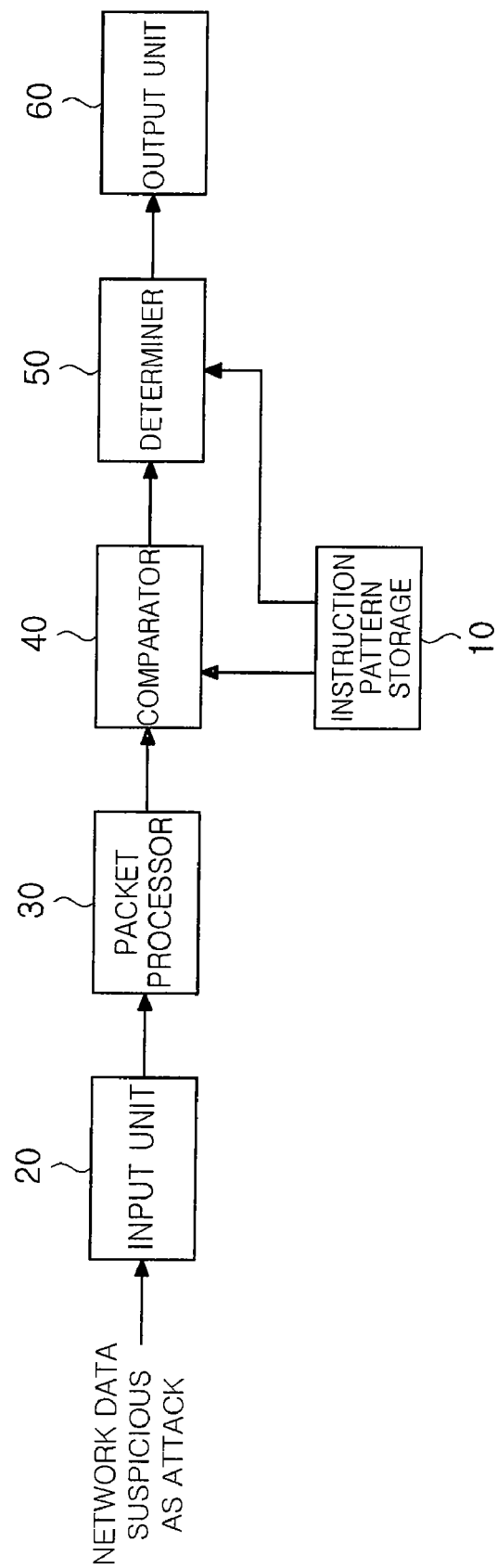
FIG. 14 is a functional block diagram illustrating an executable code detection apparatus according to an exemplary embodiment of the present invention.

FIG. 14 is a functional block diagram illustrating an executable code detection apparatus according to an exemplary embodiment of the present invention. The apparatus includes an instruction pattern storage 10, an input unit 20, a packet processor 30, a comparator 40, a determiner 50, and an output unit 60.

The instruction pattern storage 10 stores pattern information for detecting an executable code, the information on instruction patterns according to calling mechanism of function. In this case, as shown in Table 1, the instruction pattern information includes identification information of a pattern combination according to the calling mechanism of function, information on an instruction that is a reference for pattern accordance, and information on detailed instructions to be identical to count a number of successes.

In addition, as shown in Table 2, the instruction pattern storage 10 stores reference information for pattern accordance comparison for each instruction pattern, that is, a maximum instruction interval allowable to satisfy the detailed instructions, an upper threshold that is a probability of pattern accordance in the maximum instruction interval in the case of an executable code, and a lower threshold that is a probability of pattern accordance in the maximum instruction interval in the case of a non-executable code.

The input unit 20 receives network data suspicious as an attack, to verify a signature.

The packet processor 30 extracts instruction strings included in the network data by reverse assembling the network data received via the input unit 20. As shown in FIGS. 3 to 7, the network data is collected by one packet, the collected packets are sequentially arranged for each signature, one or more of fragmentation removal and packet recombination are performed, a protocol header is removed and only payloads are sequentially connected, and an instruction string is outputted by reverse assembling the connected payloads.

The comparator 40 compares the instruction string outputted from the packet processor 30 with the patterns stored in the instruction pattern storage 10 to check a degree of accordance therebetween. In this case, as described in a description on FIG. 8, the comparator 40 reads instructions from the extracted instruction string one by one, compares the instruction with each reference pattern of the instruction patterns stored in the instruction pattern storage 10, and checks whether there is present a detailed instruction in the maximum instruction interval by one of forward-comparison and backward-comparison in the case of pattern accordance. The comparator 40 outputs a result of the comparison as a pattern accordance comparison number for each pattern and a pattern accordance success number for each pattern.

The determiner 50 determines whether there is an executable code in the network data suspicious as an attack by using an output value of the comparator 40. In addition, when it is determined that there is present the executable code, reliability of the determination is calculated. In detail, as shown in FIG. 13 and Table 1, the determiner 50 obtains a ratio of the pattern accordance success number to the pattern accordance comparison number for each pattern, determines that the executable code is not present when all ratio values are not more than a lower threshold of a corresponding pattern, converts the ratio values into a relative ratio value indicating a degree of being close to an upper threshold when only one of the ratio values is greater than the lower threshold of the corresponding pattern, and outputs an average thereof as a reliability value. That is, as the reliability value is great, the reliability of the determination that there is present the executable code is high.

The output unit 60 outputs the determination result of the determiner 50, that is, whether there is present the executable code and the reliability of a case there is present the executable code.

As described above, according to an exemplary embodiment of the present invention, there is provided an executable code detection method capable of accurately determining whether there is present an executable code, that is, an attack code in network data and easily verifying an extracted signature based on the determination.

According to the present invention, it may be determined whether there is present an executable code in a central processing unit in arbitrary data in a computer or transmitted via a network, thereby verifying an extracted signature or data related to the signature formation. Accordingly, it is possible to reliably extract a signature and reliability of detecting and preventing packets possible to attack may be increased.

While the present invention has been shown and described in connection with the exemplary embodiments, it will be apparent to those skilled in the art that modifications and variations can be made without departing from the spirit and scope of the invention as defined by the appended claims.

What is claimed is:

1. A computer-implemented method of detecting an executable code, the method comprising:
   receiving network data by a computer over a computer network;
   forming an instruction by reverse assembling the received network data;
   comparing the formed instruction with an instruction pattern according to a calling mechanism of function; and
   determining whether an executable code is present in the network data according to a result of the comparing,
   wherein the method further comprises setting the instruction pattern according to the calling mechanism of function and storing instruction pattern information, before the network data is received,
   wherein the instruction pattern information comprises identification information of a pattern combination according to the calling mechanism of function, reference instruction information for pattern accordance, and detailed instruction information to accord to count a number of successes, and
   wherein the instruction pattern information comprises a maximum instruction interval allowable to satisfy the detailed instruction information for the instruction pattern, an upper threshold value that is a probability of pattern accordance in the maximum instruction interval in case of an executable code, and a lower threshold value that is a probability of pattern accordance in the maximum instruction interval in case of a non-executable code.

2. The method of claim 1, further comprising processing the network data to be available to be reverse assembled, before reverse assembling the received network data.

3. The method of claim 2, wherein the processing the network data to be available to be reverse assembled comprises:
   sequentially storing packets of the network data for each signature;
   removing fragmentation from the sequentially stored packets; and
   removing a protocol header from the packets and sequentially connecting only payloads.

4. The method of claim 3, wherein the processing the network data to be available to be reverse assembled further comprises recombining the packet when the packet is a transmission control protocol (TCP) packet, after the removing fragmentation.

5. The method of claim 1, wherein the comparing the formed instruction with the instruction pattern according to the calling mechanism of function comprises:
   determining whether the formed instruction accords with a reference instruction of the instruction pattern;
   counting a pattern accordance comparison number when the formed instruction accords with the reference instruction and determining whether the each of the formed instruction accords with the detailed instruction information of the instruction pattern; and
   counting a pattern accordance success number when the formed instruction accords with the detailed instruction information.

6. The method of claim 5, wherein the determining whether there is present an executable code in the network data comprises:
   obtaining a ratio of the pattern accordance success number to the pattern accordance comparison number for each pattern; and
   determining as the executable code is present in the network data when all of the obtained ratios are greater than the lower threshold value of the instruction pattern and determining as there is no executable code in the network data when some of the obtained ratios are less than the lower threshold value of the instruction pattern.

7. The method of claim 6, further comprising calculating reliability of the determination when it is determined that the executable code is present in the network.

8. The method of claim 7, wherein the calculating reliability of the determination comprises:
   converting the ratio of the pattern accordance success number to the pattern accordance comparison number for each pattern into a relative ratio value indicating a degree of proximity to the upper threshold value; and
   obtaining an average of the relative ratio values and outputting the average as the reliability.

9. The method of claim 8, wherein the calculating reliability of the determination further comprises giving a weight to the relative ratio value for each pattern, before obtaining the average of the relative ratio values.

10. The method of claim 8, wherein, in the converting the ratio of the pattern accordance success number to the pattern accordance comparison number for each pattern into the relative ratio value, a value of a position where the ratio value is located is calculated, within a range where the lower threshold is 0% and the upper threshold is 100%.

11. An apparatus for detecting an executable code, the apparatus comprising:

an instruction pattern storage unit configured to store information on instruction pattern according to a calling mechanism of function;

a packet processor configured to extract an instruction by reverse assembling network data that is an object of a detection to check whether the executable code is present therein;

a comparator unit configured to compare to check whether there is an instruction pattern in accordance with the instruction extracted by the packet processor, in the stored information on instruction pattern; and a determiner unit configured to determine whether there is present the executable code according to a result of the comparison of the comparator, wherein the information on the instruction pattern comprises identification information of a pattern combination according to the calling mechanism of function, reference instruction information for pattern accordance, and detailed instruction information to accord to count a number of successes, and wherein the information on the instruction pattern comprises a maximum instruction interval allowable to satisfy the detailed instruction information for the instruction pattern, an upper threshold value that is a probability of pattern accordance in the maximum instruction interval in case of the executable code, and a lower threshold value that is a probability of pattern accordance in the maximum instruction interval in case of a non-executable code.

12. The apparatus of claim 11, wherein the packet processor, before reverse assembling the network data, forms consecutive data by removing a protocol header and connecting a payload, after performing one or more of sequential arrangement, fragmentation removal, and packet recombination, on the network data for each signature.

13. The apparatus of claim 11, wherein the comparator compares the extracted instruction with a reference pattern of the stored instruction pattern, when the extracted instruction is in accordance with the reference pattern, and checks whether there is present the detailed instruction information within the maximum instruction interval by forward or backward comparison, and determines as the extracted instruction is in accordance with the reference pattern when there is present the detailed instruction information.

14. The apparatus of claim 13, wherein the comparator counts a pattern accordance comparison number for each pattern when the extracted instruction is in accordance with the reference pattern and counts a pattern accordance success number when there is present the detailed instruction.

15. The apparatus of claim 14, wherein the determiner obtains a ratio of the pattern accordance success number to the pattern accordance comparison number for each pattern, determines as the executable code is present in the network data when all of the obtained ratios are greater than the lower threshold value of the instruction pattern, and determines as there is no executable code in the network data when some of the obtained ratios are less than the lower threshold value of the instruction pattern.

16. The apparatus of claim 15, wherein the determiner calculates reliability of the determination when it is determined that there is present the executable code.

17. The apparatus of claim 16, wherein the determiner converts the ratio of the pattern accordance success number to the pattern accordance comparison number for each pattern into a relative ratio value indicating a degree of proximity to the upper threshold value, obtains an average of the relative ratio values, and outputs the average as the reliability.

18. The apparatus of claim 17, wherein the determiner gives a weight to the relative ratio value for each pattern, before the obtaining an average of the relative ratio values.

19. The apparatus of claim 17, further comprising an output unit outputting whether there is present the executable code and reliability values for determinations when it is determined that there is present the executable code, determined by the determiner.

* * * * *